Figure 1:
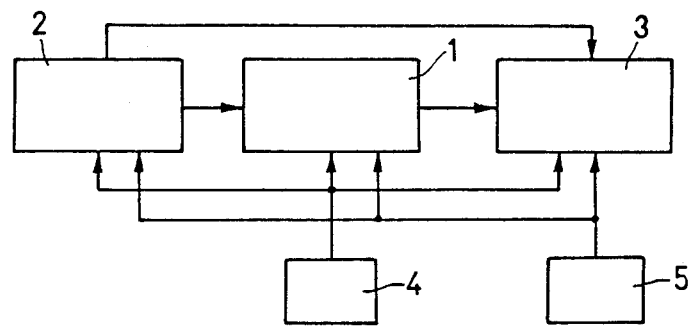

United States Patent [19]
Lie

[11] Patent Number: 4,730,285
[45] Date of Patent: Mar. 8, 1988

[54] INDIVIDUAL PARKING METER

[76] Inventor: Jon Lie, P.O. Box 54, N-2391 Moelv, Norway

[21] Appl. No.: 876,892
[22] PCT Filed: Sep. 20, 1985
[86] PCT No.: PCT/NO85/00058
 § 371 Date: Jul. 17, 1986
 § 102(e) Date: Jul. 17, 1986
[87] PCT Pub. No.: WO86/01922
 PCT Pub. Date: Mar. 27, 1986

[30] Foreign Application Priority Data
 Sep. 21, 1984 [NO] Norway ................... 843805

[51] Int. Cl.⁴ .............. G04F 1/00; G04F 8/00
[52] U.S. Cl. ...................... 368/90; 368/108; 368/276; 194/902
[58] Field of Search ............ 368/90, 92, 107, 108, 368/276; 235/377, 379, 380–381; 283/13, 23; 40/333; 194/211, 902

[56] References Cited
U.S. PATENT DOCUMENTS

| | | | |
|---|---|---|---|
| 4,195,471 | 4/1980 | Verhoeuen | 368/90 |
| 4,231,458 | 11/1980 | Limone et al. | 194/211 |
| 4,240,649 | 12/1980 | Weber | 283/13 |
| 4,575,621 | 3/1986 | Dreifus | 235/380 |
| 4,582,985 | 4/1986 | Lofberg | 235/380 |
| 4,614,861 | 9/1986 | Pavlov et al. | 235/380 |

FOREIGN PATENT DOCUMENTS
2844221 4/1980 Fed. Rep. of Germany ........ 368/90

Primary Examiner—Vit W. Miska

[57] ABSTRACT

An individual parking meter intended to be fitted in a vehicle so as to be visible for inspection from the outside comprises a parking time storage for storing of a prepaid parking time, a display (3) for displaying parking time information, and a switch means (7) for starting and stopping the parking meter. The parking time storage is a self-destructing disposable time storage which, after purchase of the parking meter, cannot be extended or renewed and reused. There is provided a parking zone selector (10) affecting the time consumption so that this runs in dependance on a set parking zone (9). The display (3) shows the remaining time stored in the storage (1), and thereafter the allowed parking time (8) remaining at any time in the current zone, and also the set zone (9). Preferably, the parking meter is designed as a card (6) in which the components of the parking meter are embedded.

6 Claims, 2 Drawing Figures

INDIVIDUAL PARKING METER

The present invention relates to an individual parking meter intended to be fitted in a vehicle so as to be visible for inspection from the outside, and comprising a parking time storage for storing of a prepaid parking time, a timing means, a display for displaying parking information, and a switch means for connection and disconnection of the parking meter.

As known, a parking meter is to show to an inspector that the parking charge for the topical parking place is paid, and that the time for which it is paid is not exceeded. It is also common that the parking charge varies in dependence on traffic density and building, and this is marked by division into zones of which each has its definite parking charge per hour.

Parking meters of the introductorily stated "individual" type in practice have a number of advantages over the traditionally used, stationarily mounted and mechanically working parking meters which are based on insertion of coins for a definite parking time. For the user, the substantial advantage is achieved that he pays only for the spent parking time. He becomes independent of coins and time-consuming or troublesome exchange. The parking meter can be used everywhere where a parking charge is demanded. It no longer becomes necessary to leave the vehicle when parking in order to buy a parking ticket or to change, since the user uses his individual parking meter which he has bought in advance and then paid for the parking time stored in the parking meter.

For the respective authority which is responsible for collecting parking charge, the following main advantages are achieved: Assembly of stationary parking meters or automatic ticket machines in the respective streets and roads is discontinued. Thus, the steet area can be better utilized, and obstacles in connection with e. g. snow clearing disappear. Parking meter emptying for coins is discontinued and the control becomes safer. The costs in connection with purchase and assembly of stationary meters disappear, and maintenance of stationary parking meters is eliminated.

An individual parking meter of the introductorily stated type is known from DE publication print No. 3 235 668. This known parking meter includes a display which, as long as the totally allowed parking time is not spent, shows an indication that parking is allowed, and which also, after a certain spent parking time, shows that only a certain "reserve" of the parking time is left, to thus enable timely replacement of the parking meter. Further, the parking meter is provided with a blocking means to prevent continuous parking in places with shorttime parking. It is also provided with a reset button which is not accessible to the user, but which is provided to enable repeated use of the parking meter after the user has applied to a controlling authority which has reset the time storage and has received a charge for another parking time period from the user.

The above-mentioned known parking meter presupposes that the user chooses and sets a certain maximum parking time when switching on the parking meter. Further, it is based on user-application to and an active contribution from the controlling authority in question when used parking meters are to be reset for repeated use. It will also be subject to maintenance problems as it is based on repeated use and thus on a long service life. This is supposed to be some of the reasons for the fact that a parking system based on such a parking meter has not come into general use in practice. The problems to be solved in connection with a parking system are relatively complex, many interacting factors having to be taken into account. Primarily, the landowner needs a control system for parking in order to have necessary traffic performed. The system should be simple in operation, cost a little in basic investment and be simple in use and simultaneously righteous to the road-users.

Thus, the object of the present invention is to provide an individual parking meter which, in one system, in an optimal manner unites solutions of the problems arising in connection with parking liable to duty.

For the achievement of this object, the present invention provides an individual parking meter of the introductorily stated type which is characterized in that the parking time storage is a disposable time storage which subsequently cannot be extended or renewed and reused.

According to an advantageous embodiment of the invention, the time storage is surrounded by a sealed casing and is self-destructing at the expiration of the stored time or if the casing is broken by an unauthorized person. Advantageously, the casing can be a plastic card in which the components of the parking meter are embedded. In a further advantageous embodiment, the parking meter includes a parking zone selector connected to the time storage, the timing means and the display, so that the consumption of the time stored in the time storage runs in dependence on a set parking zone. Advantageously, the display is then arranged to indicate the set zone in addition to the allowed parking time remaining at any time in the zone in question. In this connection it is advantageous that the display, after starting of the parking meter, is arranged firstly to show the remaining time stored in the time storage, and thereafter to show said remaining allowed parking time in the set zone.

This parking meter structure functions in the following manner: When the user starts the parking meter by depressing a start button forming part of the switch means, the display is illuminated and firstly shows the remaining storage time and simultaneously the zone lastly used during parking. The user then changes parking zone on the parking meter by depressing a zone selection button associated with the zone selector until the parking meter shows the zone applying to the parking place in question.

Counting-down of the storage time and the allowed parking time in the zone starts only a short time (aaprox. 20 seconds) after the parking meter is switched on. During this time interval the user has sufficient time to change the topical zone on the parking meter, and when the time interval is over the display indication of the remaining storage time is extinguished, and thereafter the allowed time in the zone appears in hours and minutes.

In this manner the parking quard—when the parking meter is in operation—gets information about remaining allowed parking time, and the display constantly shows the chosen zone, and the guard can then check correct zone selection as well as whether the parking time is running or has expired. In case of expired parking time, the display extinguishes completely, and parking beyond this time will then result in a penalty reaction, such as a fine, dragging-away of the vehicle, etc.

A minor problem arises when the remaining stored time of the parking meter approaches zero. It is then conceivable that the maximally allowed parking time in the zone would consume more storage time than what is left in the parking meter. This problem is solved in that the allowed parking time of the parking meter is automatically set on the maximum time for parking corresponding to the residual storage of time of the parking meter. If, for example, there are 2 hours left in the time storage and the chosen zone allows 3 hours of parking, to a cost of 1 hour of storage time for each 15 minutes of actual parking time, then the display will show an allowed parking time of 30 minutes. In this manner, the user will always be able to completely empty his parking meter of storage time.

The individual parking meter according to the invention is different from the known parking meters in the manner that, when the individual customer or user has bought his parking meter, no connection is required at a later time between the charge-collecting authority and the user. This is important, particularly on the control side. The parking meter is self-destructing at the expiration of the stored parking time. It is no carrier of any "deposit value" and thus can be kept by the user as a direct voucher in his accounts. This is especially made possible by the embodiment wherein the casing is formed as a card.

The fact that the time storage and thus the parking meter is destructed, e. g. short-circuited, and cannot be reloaded at the expiration of the bought parking time, eliminates maintenance problems as the lifetime of the product is very short.

A substantial advantage is obtained when the parking meter includes said parking zone selector, since the same parking meter can then be used in different landowner areas. When parking in another dutyable area than that for which the parking meter is primarily intended, a suitable, possibly more expensive zone is set which gives the right to such parking. In case of frequently occurring, temporary parking in several areas, it will pay to have several cards. The drawback of the landowner in case of guest parking is equalized in that reciprocity between the different landowners is presupposed. with a relatively high price of such guest parking this user advantage will not be attended with any drawback for the landowner.

The parking meter according to the invention involves a technical solution which can be used for all users and fields of use without any special adaptation. In said embodiment with a zone selector the parking meter is only based on a display and two operating buttons, i.e. an Off-On button and a zone selector button, which implies an embodiment which is very simple in use and easy to learn using. This is an essential presupposition for a product which is to be attractive to and used by the general public.

The allowed parking time of the parking meter is determined in that the time storage with associated timing and driving means are programmed for a definite time consumption, e. g. 100 hours. The programming is undertaken by the manufacturer or by the respective authority, for example the traffic manager in the town or community in question. The parking meter may also be equipped for automatic recording of an additional fee or a fine for overtime parking. Further, it may be designed so that various time switchings can be programmed, e. g. transition from day parking to night parking, or vice versa. It will be clear that the parking meter can also be used alongside existing, stationary parking meters. The task of the parking meter guard is then reduced to three functions, viz. issue of fee in case of an incorrectly chosen zone, i. e. a zone having too low fee, issue of fee when the parking meter in a parked vehicle has not been started or presented in the vehicle, and possible dragging-away in case of overtime parking.

The distribution of the individual parking meters can take place through suitable establishments, such as banks, post offices or filling stations.

Figure 2:
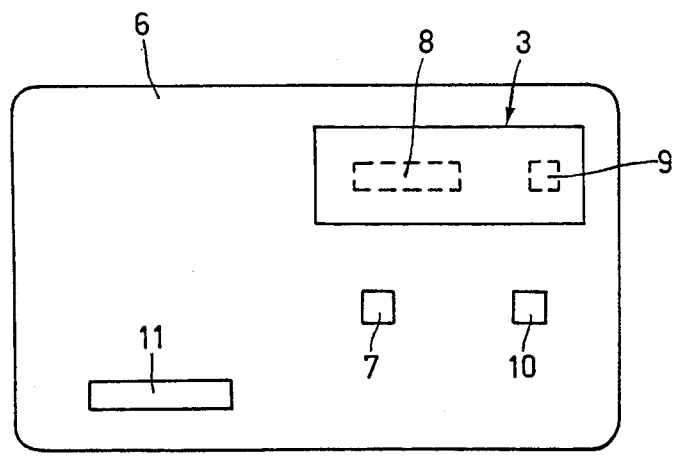

The invention will be further described below in connection with an exemplary embodiment with reference to the accompanying drawing, wherein FIG. 1 shows a schematic block diagram of the electrical circuitry in a parking meter according to the invention; and FIG. 2 shows a front view of a preferred embodiment of the parking meter according to the invention.

As appears from the schematic block diagram in FIG. 1, the shown embodiment essentially comprises a parking time storage 1 for storing of a certain parking time, a timing means 2 which is connected to the time storage 1 and in cooperation therewith causes counting-down of the stored time, and a display 3 connected to the time storage to display desired parking information. This information suitably consists of an indication of the remaining part of the time stored in the time storage. Information is also given about the parking time remaining at any time, in that the display counts down the allowed parking time in the zone in question. Further, there is provided a switch means 4 having an Off-On button (7 in FIG. 2) for connection and disconnection of electric power to the components or functional elements in the parking meter. A parking zone selector means 5 is coupled to the time storage 1, the timing means 2 and the display 3, and includes an operating button (10 in FIG. 2) for setting of correct parking zone, the circuit arrangement being such that the time consumption runs in dependence on the set zone. When connecting the parking meter, the display 3 firstly shows the remaining part of the time stored in the time storage 1, and thereafter, after an incorporated suitable time delay in which the user chooses zone, the same display shows the allowed parking time remaining at any time in the chosen zone. Thus, the stored parking time is counted down in dependence on chosen zone and actually consumed parking time in the zone.

As mentioned, the time storage of the parking meter is a disposable time storage which subsequently (i. e. after purchase of the parking meter) cannot be extended or renewed and reused. For this purpose the time storage may be surrounded by a sealed casign and be self-destructing at the expiration of the stored time or if the casing is broken by an unauthorized person. A preferred embodiment is shown in FIG. 2 showing the front side of a parking meter consisting of a card 6, e. g. of plastic material, in which the components of the parking meter are embedded. As shown, the display 3 of the parking meter is arranged in a corner area of the card. After connection by means of the Off/On button 7 of the switch means 4, the display 3 firstly shows, at 8, the remaining time in the time storage 1. Simultaneously, it shows the latest used parking zone, at 9. The desired parking zone is set by means of the operating button 10 of the zone selector means 5. For example, provision may be made for ten different parking zones which are indicated by a respective digit 0-9 in the display. The timing means 2 includes a delay circuit causing the counting-down of the time stored in the time storage 1 to start only a certain time after start of the parking meter. When the correct zone is set and the delay time has expired, the display 3 shows the set zone, at 9, and in addition, at 8, the allowed parking time remaining at any time in the zone in question. The parking meter is also provided with an indentification 11 stating the area or district for which the parking meter is primarily intended.

The detailed circuit arrangement of the parking meter according to the invention is not more specifically shown and described, as the choice of suitable circuit components will be able to be made by a person skilled in the art. The circuit structure can be based on digital technique and standard integrated circuit elements, or also consist of descrete circuit components mounted on a printed circuit card.

The parking meter may have very small dimensions, but it must be readable by an inspector outside the vehicle, which inspector shall be able to supervise that the time indication of the display is in operation, and that the zone selector is correctly set for the current parking zone.

I claim:

1. An individual parking meter intended to be fitted in a vehicle so as to be visible for inspection from the outside, and comprising
    a parking time storage for storing of a prepaid parking time, and being of a disposable type which cannot be renewed and reused after purchase of the parking meter when the prepaid parking time has been consumed,
    a timing means connected to said parking time storage,
    a display means connected to said parking time storage and said timing means, for displaying parking information in dependence on signals from said means,
    a parking zone selector connected to said time storage, timing means and display means and arranged to cause said parking time storage to count down the parking time stored therein at a rate dependent on a set parking zone,
    a source of electric power, and
    a switch means for connection and disconnection of electric power to the components of the parking meter,
    the parking meter being shaped as a sealed, card-shaped casing wherein the components of the parking meter are embedded,
    the parking zone selector being arranged to be operated by a single operating button on the front of said card, for selecting the appropriate one from a number of parking zones, and
    the switch means being operable by an on/off button on said card.

2. A parking meter according to claim 1, wherein the time storage is self-destructing at the expiration of the stored time or if said casing is broken by an unauthorized person.

3. A parking meter according to claim 1, wherein said display means is arranged to show the set zone in addition to the allowed parking time remaining at any time in the zone in question.

4. A parking meter according to claim 3, wherein said display means, after starting of the parking meter, is arranged firstly to show the remaining time stored in the time storage, and thereafter to show said remaining allowed parking time in the zet zone.

5. A parking meter according to claim 3, including a delay circuit causing the counting-down—in dependence on a set zone—of the time stored in the time storage to start a certain time after start of the parking meter.

6. A parking meter according to any of the preceding claims, wherein said casing is provided with an identification of the area or district for which the parking meter is primarily intended.

* * * * *